United States Patent [19]

Masnikosa

[11] Patent Number: 5,600,724
[45] Date of Patent: Feb. 4, 1997

[54] METHOD FOR THE PROTECTION OF MESSAGES TRANSMITTED USING PUBLIC COMMUNICATION LINES

[76] Inventor: V. P. Masnikosa, BUL. Avnoj-a 116/17, 11070 New Belgrade, Serbia, Yugoslavia

[21] Appl. No.: 448,293

[22] Filed: May 23, 1995

[51] Int. Cl.$^6$ .................. H04L 9/28; H04L 9/00
[52] U.S. Cl. .................. 380/28; 380/9; 380/49; 380/50
[58] Field of Search .................. 380/9, 28, 49, 380/50, 59

[56] References Cited

U.S. PATENT DOCUMENTS 4,703,503  10/1987  Asai .................. 380/28
5,007,089  4/1991  Matyas et al. .................. 380/49

*Primary Examiner*—Bernarr E. Gregory
*Attorney, Agent, or Firm*—Choate, Hall & Stewart

[57] ABSTRACT

A method for the protection of messages transmitted using public communication lines uses dynamic vectors that change in accord with the content of the messages. Nobody, except the one to whom an encrypted message is sent, can read it. The invention relies on message transformation into the protected sequence and vice versa. This method does not rely on any known methods that use any kind of private keys, but is comprised in the method for message protection that describes creation and use of input and dynamic symbol vector, and creation and use of dynamic index vector.

9 Claims, 32 Drawing Sheets

Figure 1

| | Input Vector | | Dynamic Symbol Vector | |
|---|---|---|---|---|
| → A 1 | → | A | 1 | 1 |
| B | | B | 2 | 2 |
| R | | C | 3 | 3 |
| A | | D | 4 | 4 |
| C | | E | 5 | 5 |
| A | | F | 6 | 6 |
| D | | G | 7 | 7 |
| A | | H | 8 | 8 |
| B | | I | 9 | 9 |
| R | | J | 10 | 10 |
| A | | K | 11 | 11 |
| | | L | 12 | 12 |
| | | M | 13 | 13 |
| | | N | 14 | 14 |
| | | O | 15 | 15 |
| | | P | 16 | 16 |
| | | Q | 17 | 17 |
| | | R | 18 | 18 |
| | | S | 19 | 19 |
| | | T | 20 | 20 |
| | | U | 21 | 21 |
| | | V | 22 | 22 |
| | | W | 23 | 23 |
| | | X | 24 | 24 |
| | | Y | 25 | 25 |
| | | Z | 26 | 26 |
| | | | | 27 | 28 |
| | | | | 28 | 29 |
| | | | | 29 | 30 |
| | | | | 30 | |

| | |
|---|---|
| A | 1 |
| → B | 2 |
| R | |
| A | |
| C | |
| A | |
| D | |
| A | |
| B | |
| R | |
| A | |

→

Input Vector

| | |
|---|---|
| A | 27 |
| B | 2 |
| C | 3 |
| D | 4 |
| E | 5 |
| F | 6 |
| G | 7 |
| H | 8 |
| I | 9 |
| J | 10 |
| K | 11 |
| L | 12 |
| M | 13 |
| N | 14 |
| O | 15 |
| P | 16 |
| Q | 17 |
| R | 18 |
| S | 19 |
| T | 20 |
| U | 21 |
| V | 22 |
| W | 23 |
| X | 24 |
| Y | 25 |
| Z | 26 |

Dynamic Symbol Vector

| | |
|---|---|
| 1 | |
| 2 | |
| 3 | |
| 4 | |
| 5 | |
| 6 | |
| 7 | |
| 8 | |
| 9 | |
| 10 | |
| 11 | |
| 12 | |
| 13 | |
| 14 | |
| 15 | |
| 16 | |
| 17 | |
| 18 | |
| 19 | |
| 20 | |
| 21 | |
| 22 | |
| 23 | |
| 24 | |
| 25 | |
| 26 | |
| 27 | 28 |
| 28 | 29 |
| 29 | 30 |
| 30 | 1 |

| 28 | P1

| 1 | P2

Figure 3

| | |
|---|---|
| A | 1 |
| B | 2 |
| → R | 18 |
| A | |
| C | |
| A | |
| D | |
| A | |
| B | |
| R | |
| A | |

Input Vector

| | |
|---|---|
| A | 27 |
| B | 28 |
| C | 3 |
| D | 4 |
| E | 5 |
| F | 6 |
| G | 7 |
| H | 8 |
| I | 9 |
| J | 10 |
| K | 11 |
| L | 12 |
| M | 13 |
| N | 14 |
| O | 15 |
| P | 16 |
| Q | 17 |
| → R | 18 |
| S | 19 |
| T | 20 |
| U | 21 |
| V | 22 |
| W | 23 |
| X | 24 |
| Y | 25 |
| Z | 26 |

Dynamic Symbol Vector

| | |
|---|---|
| 1 | 2 |
| 2 | |
| 3 | |
| 4 | |
| 5 | |
| 6 | |
| 7 | |
| 8 | |
| 9 | |
| 10 | |
| 11 | |
| 12 | |
| 13 | |
| 14 | |
| 15 | |
| 16 | |
| 17 | |
| 18 | |
| 19 | |
| 20 | |
| 21 | |
| 22 | |
| 23 | |
| 24 | |
| 25 | |
| 26 | |
| 27 | 28 |
| 28 | 29 |
| 29 | 30 |
| 30 | 1 |

| 29 | P1 |
|---|---|

| 2 | P2 |
|---|---|

Figure 4

| | |
|---|---|
| A | 1 |
| B | 2 |
| R | 18 |
| A | 27 |
| C | |
| A | |
| D | |
| A | |
| B | |
| R | |
| A | |

Input Vector

| | |
|---|---|
| A | 27 |
| B | 28 |
| C | 3 |
| D | 4 |
| E | 5 |
| F | 6 |
| G | 7 |
| H | 8 |
| I | 9 |
| J | 10 |
| K | 11 |
| L | 12 |
| M | 13 |
| N | 14 |
| O | 15 |
| P | 16 |
| Q | 17 |
| R | 29 |
| S | 19 |
| T | 20 |
| U | 21 |
| V | 22 |
| W | 23 |
| X | 24 |
| Y | 25 |
| Z | 26 |

Dynamic Symbol Vector

| | |
|---|---|
| 1 | 2 |
| 2 | 18 |
| 3 | |
| 4 | |
| 5 | |
| 6 | |
| 7 | |
| 8 | |
| 9 | |
| 10 | |
| 11 | |
| 12 | |
| 13 | |
| 14 | |
| 15 | |
| 16 | |
| 17 | |
| 18 | |
| 19 | |
| 20 | |
| 21 | |
| 22 | |
| 23 | |
| 24 | |
| 25 | |
| 26 | |
| 27 | 28 |
| 28 | 29 |
| 29 | 30 |
| 30 | 1 |

| 30 | P1
| 18 | P2

Figure 6

| | |
|---|---|
| A | 1 |
| B | 2 |
| R | 18 |
| A | 27 |
| C | 3 |
| A | 30 |
| D | |
| A | |
| B | |
| R | |
| A | |

Input Vector

| | |
|---|---|
| A | 30 |
| B | 28 |
| C | 1 |
| D | 4 |
| E | 5 |
| F | 6 |
| G | 7 |
| H | 8 |
| I | 9 |
| J | 10 |
| K | 11 |
| L | 12 |
| M | 13 |
| N | 14 |
| O | 15 |
| P | 16 |
| Q | 17 |
| R | 29 |
| S | 19 |
| T | 20 |
| U | 21 |
| V | 22 |
| W | 23 |
| X | 24 |
| Y | 25 |
| Z | 26 |

Dynamic Symbol Vector

| | |
|---|---|
| 1 | 2 |
| 2 | 18 |
| 3 | |
| 4 | |
| 5 | |
| 6 | |
| 7 | |
| 8 | |
| 9 | |
| 10 | |
| 11 | |
| 12 | |
| 13 | |
| 14 | |
| 15 | |
| 16 | |
| 17 | |
| 18 | 27 |
| 19 | |
| 20 | |
| 21 | |
| 22 | |
| 23 | |
| 24 | |
| 25 | |
| 26 | |
| 27 | 3 |
| 28 | 29 |
| 29 | 30 |
| 30 | 1 |

| 2 | P1 |

| 3 | P2 |

Figure 7

| | |
|---|---|
| A | 1 |
| B | 2 |
| R | 18 |
| A | 27 |
| C | 3 |
| A | 30 |
| → D | 4 |
| A | |
| B | |
| R | |
| A | |

Input Vector

| | |
|---|---|
| A | 2 |
| B | 28 |
| C | 1 |
| D | 4 |
| E | 5 |
| F | 6 |
| G | 7 |
| H | 8 |
| I | 9 |
| J | 10 |
| K | 11 |
| L | 12 |
| M | 13 |
| N | 14 |
| O | 15 |
| P | 16 |
| Q | 17 |
| R | 29 |
| S | 19 |
| T | 20 |
| U | 21 |
| V | 22 |
| W | 23 |
| X | 24 |
| Y | 25 |
| Z | 26 |

Dynamic Symbol Vector

| | |
|---|---|
| 1 | 2 |
| 2 | 18 |
| 3 | 30 |
| 4 | |
| 5 | |
| 6 | |
| 7 | |
| 8 | |
| 9 | |
| 10 | |
| 11 | |
| 12 | |
| 13 | |
| 14 | |
| 15 | |
| 16 | |
| 17 | |
| 18 | 27 |
| 19 | |
| 20 | |
| 21 | |
| 22 | |
| 23 | |
| 24 | |
| 25 | |
| 26 | |
| 27 | 3 |
| 28 | 29 |
| 29 | 30 |
| 30 | 1 |

| 18 | P1

| 30 | P2

Figure 8

| | |
|---|---|
| A | 1 |
| B | 2 |
| R | 18 |
| A | 27 |
| C | 3 |
| A | 30 |
| D | 4 |
| → A | 2 |
| B | |
| R | |
| A | |

Input Vector

| | |
|---|---|
| A | 2 |
| B | 28 |
| C | 1 |
| D | 18 |
| E | 5 |
| F | 6 |
| G | 7 |
| H | 8 |
| I | 9 |
| J | 10 |
| K | 11 |
| L | 12 |
| M | 13 |
| N | 14 |
| O | 15 |
| P | 16 |
| Q | 17 |
| R | 29 |
| S | 19 |
| T | 20 |
| U | 21 |
| V | 22 |
| W | 23 |
| X | 24 |
| Y | 25 |
| Z | 26 |

Dynamic Symbol Vector

| | |
|---|---|
| 1 | 2 |
| 2 | 18 |
| 3 | 30 |
| 4 | |
| 5 | |
| 6 | |
| 7 | |
| 8 | |
| 9 | |
| 10 | |
| 11 | |
| 12 | |
| 13 | |
| 14 | |
| 15 | |
| 16 | |
| 17 | |
| 18 | 27 |
| 19 | |
| 20 | |
| 21 | |
| 22 | |
| 23 | |
| 24 | |
| 25 | |
| 26 | |
| 27 | 3 |
| 28 | 29 |
| 29 | 30 |
| 30 | 4 |

| | |
|---|---|
| A | 1 |
| B | 2 |
| R | 18 |
| A | 27 |
| C | 3 |
| A | 30 |
| D | 4 |
| A | 2 |
| → B | 28 |
| R | |
| A | |

Input Vector

| | |
|---|---|
| A | 27 |
| B | 28 |
| C | 1 |
| D | 18 |
| E | 5 |
| F | 6 |
| G | 7 |
| H | 8 |
| I | 9 |
| J | 10 |
| K | 11 |
| L | 12 |
| M | 13 |
| N | 14 |
| O | 15 |
| P | 16 |
| Q | 17 |
| R | 29 |
| S | 19 |
| T | 20 |
| U | 21 |
| V | 22 |
| W | 23 |
| X | 24 |
| Y | 25 |
| Z | 26 |

Dynamic Symbol Vector

| | |
|---|---|
| 1 | 2 |
| 2 | 18 |
| 3 | 30 |
| 4 | 2 |
| 5 | |
| 6 | |
| 7 | |
| 8 | |
| 9 | |
| 10 | |
| 11 | |
| 12 | |
| 13 | |
| 14 | |
| 15 | |
| 16 | |
| 17 | |
| 18 | 27 |
| 19 | |
| 20 | |
| 21 | |
| 22 | |
| 23 | |
| 24 | |
| 25 | |
| 26 | |
| 27 | 3 |
| 28 | 29 |
| 29 | 30 |
| 30 | 4 |

| 3 | P1 |
|---|---|

| 2 | P2 |
|---|---|

Figure 10

| | |
|---|---|
| A | 1 |
| B | 2 |
| R | 18 |
| A | 27 |
| C | 3 |
| A | 30 |
| D | 4 |
| A | 2 |
| B | 28 |
| → R | 29 |
| A | |

Input Vector

| | |
|---|---|
| A | 27 |
| B | 3 |
| C | 1 |
| D | 18 |
| E | 5 |
| F | 6 |
| G | 7 |
| H | 8 |
| I | 9 |
| J | 10 |
| K | 11 |
| L | 12 |
| M | 13 |
| N | 14 |
| O | 15 |
| P | 16 |
| Q | 17 |
| → R | 29 |
| S | 19 |
| T | 20 |
| U | 21 |
| V | 22 |
| W | 23 |
| X | 24 |
| Y | 25 |
| Z | 26 |

Dynamic Symbol Vector

| | |
|---|---|
| 1 | 2 |
| 2 | 28 |
| 3 | 30 |
| 4 | 2 |
| 5 | |
| 6 | |
| 7 | |
| 8 | |
| 9 | |
| 10 | |
| 11 | |
| 12 | |
| 13 | |
| 14 | |
| 15 | |
| 16 | |
| 17 | |
| 18 | 27 |
| 19 | |
| 20 | |
| 21 | |
| 22 | |
| 23 | |
| 24 | |
| 25 | |
| 26 | |
| 27 | 3 |
| 28 | 29 |
| 29 | 30 |
| 30 | 4 |

| 30 | P1

| 28 | P2

Figure 11

| | |
|---|---|
| A | 1 |
| B | 2 |
| R | 18 |
| A | 27 |
| C | 3 |
| A | 30 |
| D | 4 |
| A | 2 |
| B | 28 |
| R | 29 |
| → A | 27 |

Input Vector

| | |
|---|---|
| → A | 27 |
| B | 3 |
| C | 1 |
| D | 18 |
| E | 5 |
| F | 6 |
| G | 7 |
| H | 8 |
| I | 9 |
| J | 10 |
| K | 11 |
| L | 12 |
| M | 13 |
| N | 14 |
| O | 15 |
| P | 16 |
| Q | 17 |
| R | 30 |
| S | 19 |
| T | 20 |
| U | 21 |
| V | 22 |
| W | 23 |
| X | 24 |
| Y | 25 |
| Z | 26 |

Dynamic Symbol Vector

| | |
|---|---|
| 1 | 2 |
| 2 | 28 |
| 3 | 30 |
| 4 | 2 |
| 5 | |
| 6 | |
| 7 | |
| 8 | |
| 9 | |
| 10 | |
| 11 | |
| 12 | |
| 13 | |
| 14 | |
| 15 | |
| 16 | |
| 17 | |
| 18 | 27 |
| 19 | |
| 20 | |
| 21 | |
| 22 | |
| 23 | |
| 24 | |
| 25 | |
| 26 | |
| 27 | 3 |
| 28 | 29 |
| 29 | 27 |
| 30 | 4 |

| 4 | P1

| 29 | P2

Figure 12

| | |
|---|---|
| 1 | A |
| 2 | |
| 18 | |
| 27 | |
| 3 | |
| 30 | |
| 4 | |
| 2 | |
| 28 | |
| 29 | |
| 27 | |

Dynamic Index Vector

| | | |
|---|---|---|
| 1 | A | |
| 2 | B | |
| 3 | C | |
| 4 | D | |
| 5 | E | |
| 6 | F | |
| 7 | G | |
| 8 | H | |
| 9 | I | |
| 10 | J | |
| 11 | K | |
| 12 | L | |
| 13 | M | |
| 14 | N | |
| 15 | O | |
| 16 | P | |
| 17 | Q | |
| 18 | R | |
| 19 | S | |
| 20 | T | |
| 21 | U | |
| 22 | V | |
| 23 | W | |
| 24 | X | |
| 25 | Y | |
| 26 | Z | |
| 27 | | 28 |
| 28 | | 29 |
| 29 | | 30 |
| 30 | | |

| 27 | P3 |
|---|---|

| 30 | P4 |
|---|---|

Figure 13

|   |   |
|---|---|
| 1 | A |
| 2 | B |
| 18 |   |
| 27 |   |
| 3 |   |
| 30 |   |
| 4 |   |
| 2 |   |
| 28 |   |
| 29 |   |
| 27 |   |

Dynamic Index Vector

|   |   |   |
|---|---|---|
| 1 | A |   |
| 2 | B |   |
| 3 | C |   |
| 4 | D |   |
| 5 | E |   |
| 6 | F |   |
| 7 | G |   |
| 8 | H |   |
| 9 | I |   |
| 10 | J |   |
| 11 | K |   |
| 12 | L |   |
| 13 | M |   |
| 14 | N |   |
| 15 | O |   |
| 16 | P |   |
| 17 | Q |   |
| 18 | R |   |
| 19 | S |   |
| 20 | T |   |
| 21 | U |   |
| 22 | V |   |
| 23 | W |   |
| 24 | X |   |
| 25 | Y |   |
| 26 | Z |   |
| 27 | A | 28 |
| 28 |   | 29 |
| 29 |   | 30 |
| 30 |   | 1 |

| 28 | P3 |

| 1 | P4 |

Figure 14

| | |
|---|---|
| 1 | A |
| 2 | B |
| → 18 | R |
| 27 | |
| 3 | |
| 30 | |
| 4 | |
| 2 | |
| 28 | |
| 29 | |
| 27 | |

Dynamic Index Vector

| | | |
|---|---|---|
| 1 | A | 2 |
| 2 | B | |
| 3 | C | |
| 4 | D | |
| 5 | E | |
| 6 | F | |
| 7 | G | |
| 8 | H | |
| 9 | I | |
| 10 | J | |
| 11 | K | |
| 12 | L | |
| 13 | M | |
| 14 | N | |
| 15 | O | |
| 16 | P | |
| 17 | Q | |
| → 18 | R | |
| 19 | S | |
| 20 | T | |
| 21 | U | |
| 22 | V | |
| 23 | W | |
| 24 | X | |
| 25 | Y | |
| 26 | Z | |
| 27 | A | 28 |
| 28 | B | 29 |
| 29 | | 30 |
| 30 | | 1 |

| 29 | P3 |
|---|---|

| 2 | P4 |
|---|---|

Figure 15

| 1 | A |
|---|---|
| 2 | B |
| 18 | R |
| 27 | A |
| 3 | |
| 30 | |
| 4 | |
| 2 | |
| 28 | |
| 29 | |
| 27 | |

→

Dynamic Index Vector

| 1 | A | 2 |
|---|---|---|
| 2 | B | 18 |
| 3 | C | |
| 4 | D | |
| 5 | E | |
| 6 | F | |
| 7 | G | |
| 8 | H | |
| 9 | I | |
| 10 | J | |
| 11 | K | |
| 12 | L | |
| 13 | M | |
| 14 | N | |
| 15 | O | |
| 16 | P | |
| 17 | Q | |
| 18 | R | |
| 19 | S | |
| 20 | T | |
| 21 | U | |
| 22 | V | |
| 23 | W | |
| 24 | X | |
| 25 | Y | |
| 26 | Z | |
| 27 | A | 28 |
| 28 | B | 29 |
| 29 | R | 30 |
| 30 | | 1 |

| 30 | P3

| 18 | P4

Figure 16

| | |
|---|---|
| 1 | A |
| 2 | B |
| 18 | R |
| 27 | A |
| → 3 | C |
| 30 | |
| 4 | |
| 2 | |
| 28 | |
| 29 | |
| 27 | |

Dynamic Index Vector

| | | |
|---|---|---|
| 1 | A | 2 |
| 2 | B | 18 |
| → 3 | C | |
| 4 | D | |
| 5 | E | |
| 6 | F | |
| 7 | G | |
| 8 | H | |
| 9 | I | |
| 10 | J | |
| 11 | K | |
| 12 | L | |
| 13 | M | |
| 14 | N | |
| 15 | O | |
| 16 | P | |
| 17 | Q | |
| 18 | R | 27 |
| 19 | S | |
| 20 | T | |
| 21 | U | |
| 22 | V | |
| 23 | W | |
| 24 | X | |
| 25 | Y | |
| 26 | Z | |
| 27 | A | 28 |
| 28 | B | 29 |
| 29 | R | 30 |
| 30 | A | 1 |

| 1 | P3 |
|---|---|

| 27 | P4 |
|---|---|

Figure 17

| | |
|---|---|
| 1 | A |
| 2 | B |
| 18 | R |
| 27 | A |
| 3 | C |
| → 30 | A |
| 4 | |
| 2 | |
| 28 | |
| 29 | |
| 27 | |

Dynamic Index Vector

| | | |
|---|---|---|
| 1 | C | 2 |
| 2 | B | 18 |
| 3 | C | |
| 4 | D | |
| 5 | E | |
| 6 | F | |
| 7 | G | |
| 8 | H | |
| 9 | I | |
| 10 | J | |
| 11 | K | |
| 12 | L | |
| 13 | M | |
| 14 | N | |
| 15 | O | |
| 16 | P | |
| 17 | Q | |
| 18 | R | 27 |
| 19 | S | |
| 20 | T | |
| 21 | U | |
| 22 | V | |
| 23 | W | |
| 24 | X | |
| 25 | Y | |
| 26 | Z | |
| 27 | A | 3 |
| 28 | B | 29 |
| 29 | R | 30 |
| → 30 | A | 1 |

| 2 | P3

| 3 | P4

Figure 18

| | |
|---|---|
| 1 | A |
| 2 | B |
| 18 | R |
| 27 | A |
| 3 | C |
| 30 | A |
| → 4 | D |
| 2 | |
| 28 | |
| 29 | |
| 27 | |

Dynamic Index Vector

| | | |
|---|---|---|
| 1 | C | 2 |
| 2 | A | 18 |
| 3 | C | 30 |
| → 4 | D | |
| 5 | E | |
| 6 | F | |
| 7 | G | |
| 8 | H | |
| 9 | I | |
| 10 | J | |
| 11 | K | |
| 12 | L | |
| 13 | M | |
| 14 | N | |
| 15 | O | |
| 16 | P | |
| 17 | Q | |
| 18 | R | 27 |
| 19 | S | |
| 20 | T | |
| 21 | U | |
| 22 | V | |
| 23 | W | |
| 24 | X | |
| 25 | Y | |
| 26 | Z | |
| 27 | A | 3 |
| 28 | B | 29 |
| 29 | R | 30 |
| 30 | A | 1 |

| 18 | P3 |
|---|---|

| 30 | P4 |
|---|---|

Figure 19

| | |
|---|---|
| 1 | A |
| 2 | B |
| 18 | R |
| 27 | A |
| 3 | C |
| 30 | A |
| 4 | D |
→ | 2 | A |
| 28 | |
| 29 | |
| 27 | |

Dynamic Index Vector

| | | |
|---|---|---|
| 1 | C | 2 |
→ 2 | A | 18 |
| 3 | C | 30 |
| 4 | D | |
| 5 | E | |
| 6 | F | |
| 7 | G | |
| 8 | H | |
| 9 | I | |
| 10 | J | |
| 11 | K | |
| 12 | L | |
| 13 | M | |
| 14 | N | |
| 15 | O | |
| 16 | P | |
| 17 | Q | |
| 18 | D | |
| 19 | S | |
| 20 | T | |
| 21 | U | |
| 22 | V | |
| 23 | W | |
| 24 | X | |
| 25 | Y | |
| 26 | Z | |
| 27 | A | 28 |
| 28 | B | 29 |
| 29 | R | 30 |
| 30 | A | 4 |

| 27 | P3

| 4 | P4

Figure 20

|   |   |
|---|---|
| 1 | A |
| 2 | B |
| 18 | R |
| 27 | A |
| 3 | C |
| 30 | A |
| 4 | D |
| 2 | A |
| → 28 | B |
| 29 |   |
| 27 |   |

Dynamic Index Vector

|   |   |   |
|---|---|---|
| 1 | C | 2 |
| 2 | A | 18 |
| 3 | C | 30 |
| 4 | D | 2 |
| 5 | E |   |
| 6 | F |   |
| 7 | G |   |
| 8 | H |   |
| 9 | I |   |
| 10 | J |   |
| 11 | K |   |
| 12 | L |   |
| 13 | M |   |
| 14 | N |   |
| 15 | O |   |
| 16 | P |   |
| 17 | Q |   |
| 18 | D | 27 |
| 19 | S |   |
| 20 | T |   |
| 21 | U |   |
| 22 | V |   |
| 23 | W |   |
| 24 | X |   |
| 25 | Y |   |
| 26 | Z |   |
| 27 | A | 3 |
| → 28 | B | 29 |
| 29 | R | 30 |
| 30 | A | 4 |

| 3 | P3 |
|---|---|

| 2 | P4 |
|---|---|

Figure 21

| | |
|---|---|
| 1 | A |
| 2 | B |
| 18 | R |
| 27 | A |
| 3 | C |
| 30 | A |
| 4 | D |
| 2 | A |
| 28 | B |
| → 29 | R |
| 27 | |

Dynamic Index Vector

| | | |
|---|---|---|
| 1 | C | 2 |
| 2 | A | 28 |
| 3 | B | 30 |
| 4 | D | 2 |
| 5 | E | |
| 6 | F | |
| 7 | G | |
| 8 | H | |
| 9 | I | |
| 10 | J | |
| 11 | K | |
| 12 | L | |
| 13 | M | |
| 14 | N | |
| 15 | O | |
| 16 | P | |
| 17 | Q | |
| 18 | D | |
| 19 | S | |
| 20 | T | |
| 21 | U | |
| 22 | V | |
| 23 | W | |
| 24 | X | |
| 25 | Y | |
| 26 | Z | |
| 27 | A | 28 |
| 28 | B | 29 |
| → 29 | R | 30 |
| 30 | A | 4 |

| 30 | P3 |
|---|---|

| 28 | P4 |
|---|---|

Figure 22

| | |
|---|---|
| 1 | A |
| 2 | B |
| 18 | R |
| 27 | A |
| 3 | C |
| 30 | A |
| 4 | D |
| 2 | A |
| 28 | B |
| 29 | R |
| → 27 | A |

Dynamic Index Vector

| | | |
|---|---|---|
| 1 | C | 2 |
| 2 | A | 28 |
| 3 | B | 30 |
| 4 | D | 2 |
| 5 | E | |
| 6 | F | |
| 7 | G | |
| 8 | H | |
| 9 | I | |
| 10 | J | |
| 11 | K | |
| 12 | L | |
| 13 | M | |
| 14 | N | |
| 15 | O | |
| 16 | P | |
| 17 | Q | |
| 18 | D | 27 |
| 19 | S | |
| 20 | T | |
| 21 | U | |
| 22 | V | |
| 23 | W | |
| 24 | X | |
| 25 | Y | |
| 26 | Z | |
| → 27 | A | 3 |
| 28 | B | 29 |
| 29 | R | 27 |
| 30 | A | 4 |

| 4 | P3 |
|---|---|

| 29 | P4 |
|---|---|

Figure 23

| J | Message Array | | | Input Vector (INP) | | | DSV | | P_1 | P_2 |
|---|---|---|---|---|---|---|---|---|---|---|
| 0 | MSG | PRO | | SYM | IND | | 1 | | 27 | 30 |
| | T | | | A | 1 | | 2 | | | |
| | E | | | B | 2 | | 3 | | | |
| | S | | | C | 3 | | 4 | | | |
| | T | | | D | 4 | | 5 | | | |
| | | | | E | 5 | | 6 | | | |
| | | | | F | 6 | | 7 | | | |
| | | | | G | 7 | | 8 | | | |
| | | | | H | 8 | | 9 | | | |
| | | | | I | 9 | | 10 | | | |
| | | | | J | 10 | | 11 | | | |
| | | | | K | 11 | | 12 | | | |
| | | | | L | 12 | | 13 | | | |
| | | | | M | 13 | | 14 | | | |
| | | | | N | 14 | | 15 | | | |
| | | | | O | 15 | | 16 | | | |
| | | | | P | 16 | | 17 | | | |
| | | | | Q | 17 | | 18 | | | |
| | | | | R | 18 | | 19 | | | |
| | | | | S | 19 | | 20 | | | |
| | | | | T | 20 | | 21 | | | |
| | | | | U | 21 | | 22 | | | |
| | | | | V | 22 | | 23 | | | |
| | | | | W | 23 | | 24 | | | |
| | | | | X | 24 | | 25 | | | |
| | | | | Y | 25 | | 26 | | | |
| | | | | Z | 26 | | 27 | 28 | | |
| | | | | | | | 28 | 29 | | |
| | | | | | | | 29 | 30 | | |
| | | | | | | | 30 | | | |

Figure 24

| J | Message Array | | | Input Vector (INP) | | | DSV | | P_1 | P_2 |
|---|---|---|---|---|---|---|---|---|---|---|
| 1 | MSG | PRO | | SYM | IND | | 1 | | 28 | 20 |
| | T | 20 | | A | 1 | | 2 | | | |
| | E | | | B | 2 | | 3 | | | |
| | S | | | C | 3 | | 4 | | | |
| | T | | | D | 4 | | 5 | | | |
| | | | | E | 5 | | 6 | | | |
| | | | | F | 6 | | 7 | | | |
| | | | | G | 7 | | 8 | | | |
| | | | | H | 8 | | 9 | | | |
| | | | | I | 9 | | 10 | | | |
| | | | | J | 10 | | 11 | | | |
| | | | | K | 11 | | 12 | | | |
| | | | | L | 12 | | 13 | | | |
| | | | | M | 13 | | 14 | | | |
| | | | | N | 14 | | 15 | | | |
| | | | | O | 15 | | 16 | | | |
| | | | | P | 16 | | 17 | | | |
| | | | | Q | 17 | | 18 | | | |
| | | | | R | 18 | | 19 | | | |
| | | | | S | 19 | | 20 | | | |
| | | | | T | 27 | | 21 | | | |
| | | | | U | 21 | | 22 | | | |
| | | | | V | 22 | | 23 | | | |
| | | | | W | 23 | | 24 | | | |
| | | | | X | 24 | | 25 | | | |
| | | | | Y | 25 | | 26 | | | |
| | | | | Z | 26 | | 27 | 28 | | |
| | | | | | | | 28 | 29 | | |
| | | | | | | | 29 | 30 | | |
| | | | | | | | 30 | 20 | | |

Figure 25

| J | Message Array | | | Input Vector (INP) | | | | DSV | | P_1 | P_2 |
|---|---|---|---|---|---|---|---|---|---|---|---|
| 2 | MSG | PRO | | SYM | IND | | 1 | | | 29 | 5 |
| | T | 20 | | A | 1 | | 2 | | | | |
| | E | 5 | | B | 2 | | 3 | | | | |
| | S | | | C | 3 | | 4 | | | | |
| | T | | | D | 4 | | 5 | | | | |
| | | | | E | 28 | | 6 | | | | |
| | | | | F | 6 | | 7 | | | | |
| | | | | G | 7 | | 8 | | | | |
| | | | | H | 8 | | 9 | | | | |
| | | | | I | 9 | | 10 | | | | |
| | | | | J | 10 | | 11 | | | | |
| | | | | K | 11 | | 12 | | | | |
| | | | | L | 12 | | 13 | | | | |
| | | | | M | 13 | | 14 | | | | |
| | | | | N | 14 | | 15 | | | | |
| | | | | O | 15 | | 16 | | | | |
| | | | | P | 16 | | 17 | | | | |
| | | | | Q | 17 | | 18 | | | | |
| | | | | R | 18 | | 19 | | | | |
| | | | | S | 19 | | 20 | 5 | | | |
| | | | | T | 27 | | 21 | | | | |
| | | | | U | 21 | | 22 | | | | |
| | | | | V | 22 | | 23 | | | | |
| | | | | W | 23 | | 24 | | | | |
| | | | | X | 24 | | 25 | | | | |
| | | | | Y | 25 | | 26 | | | | |
| | | | | Z | 26 | | 27 | 28 | | | |
| | | | | | | | 28 | 29 | | | |
| | | | | | | | 29 | 30 | | | |
| | | | | | | | 30 | 20 | | | |

Figure 26

| J | Message Array | | | Input Vector (INP) | | | DSV | | P_1 | P_2 |
|---|---|---|---|---|---|---|---|---|---|---|
| 3 | MSG | PRO | | SYM | IND | 1 | | | 30 | 19 |
| | T | 20 | | A | 1 | 2 | | | | |
| | E | 5 | | B | 2 | 3 | | | | |
| | S | 19 | | C | 3 | 4 | | | | |
| | T | | | D | 4 | 5 | 19 | | | |
| | | | | E | 28 | 6 | | | | |
| | | | | F | 6 | 7 | | | | |
| | | | | G | 7 | 8 | | | | |
| | | | | H | 8 | 9 | | | | |
| | | | | I | 9 | 10 | | | | |
| | | | | J | 10 | 11 | | | | |
| | | | | K | 11 | 12 | | | | |
| | | | | L | 12 | 13 | | | | |
| | | | | M | 13 | 14 | | | | |
| | | | | N | 14 | 15 | | | | |
| | | | | O | 15 | 16 | | | | |
| | | | | P | 16 | 17 | | | | |
| | | | | Q | 17 | 18 | | | | |
| | | | | R | 18 | 19 | | | | |
| | | | | S | 29 | 20 | 5 | | | |
| | | | | T | 27 | 21 | | | | |
| | | | | U | 21 | 22 | | | | |
| | | | | V | 22 | 23 | | | | |
| | | | | W | 23 | 24 | | | | |
| | | | | X | 24 | 25 | | | | |
| | | | | Y | 25 | 26 | | | | |
| | | | | Z | 26 | 27 | 28 | | | |
| | | | | | | 28 | 29 | | | |
| | | | | | | 29 | 30 | | | |
| | | | | | | 30 | 20 | | | |

Figure 27

| J | Message Array | | | Input Vector (INP) | | | | DSV | | P_1 | P_2 |
|---|---|---|---|---|---|---|---|---|---|---|---|
| 4 | MSG | PRO | | SYM | IND | | 1 | | | 1 | 27 |
| | T | 20 | | A | 1 | | 2 | | | | |
| | E | 5 | | B | 2 | | 3 | | | | |
| | S | 19 | | C | 3 | | 4 | | | | |
| | T | 27 | | D | 4 | | 5 | 19 | | | |
| | | | | E | 28 | | 6 | | | | |
| | | | | F | 6 | | 7 | | | | |
| | | | | G | 7 | | 8 | | | | |
| | | | | H | 8 | | 9 | | | | |
| | | | | I | 9 | | 10 | | | | |
| | | | | J | 10 | | 11 | | | | |
| | | | | K | 11 | | 12 | | | | |
| | | | | L | 12 | | 13 | | | | |
| | | | | M | 13 | | 14 | | | | |
| | | | | N | 14 | | 15 | | | | |
| | | | | O | 15 | | 16 | | | | |
| | | | | P | 16 | | 17 | | | | |
| | | | | Q | 17 | | 18 | | | | |
| | | | | R | 18 | | 19 | 27 | | | |
| | | | | S | 29 | | 20 | 5 | | | |
| | | | | T | 30 | | 21 | | | | |
| | | | | U | 21 | | 22 | | | | |
| | | | | V | 22 | | 23 | | | | |
| | | | | W | 23 | | 24 | | | | |
| | | | | X | 24 | | 25 | | | | |
| | | | | Y | 25 | | 26 | | | | |
| | | | | Z | 26 | | 27 | 28 | | | |
| | | | | | | | 28 | 29 | | | |
| | | | | | | | 29 | 30 | | | |
| | | | | | | | 30 | 20 | | | |

Figure 28

| J | Message Array | | | DIV | | | P_3 | P_4 |
|---|---|---|---|---|---|---|---|---|
| 0 | PRO | MSG | | SYM | IND | | 27 | 30 |
| | 20 | | 1 | A | | | | |
| | 5 | | 2 | B | | | | |
| | 19 | | 3 | C | | | | |
| | 27 | | 4 | D | | | | |
| | | | 5 | E | | | | |
| | | | 6 | F | | | | |
| | | | 7 | G | | | | |
| | | | 8 | H | | | | |
| | | | 9 | I | | | | |
| | | | 10 | J | | | | |
| | | | 11 | K | | | | |
| | | | 12 | L | | | | |
| | | | 13 | M | | | | |
| | | | 14 | N | | | | |
| | | | 15 | O | | | | |
| | | | 16 | P | | | | |
| | | | 17 | Q | | | | |
| | | | 18 | R | | | | |
| | | | 19 | S | | | | |
| | | | 20 | T | | | | |
| | | | 21 | U | | | | |
| | | | 22 | V | | | | |
| | | | 23 | W | | | | |
| | | | 24 | X | | | | |
| | | | 25 | Y | | | | |
| | | | 26 | Z | | | | |
| | | | 27 | | 28 | | | |
| | | | 28 | | 29 | | | |
| | | | 29 | | 30 | | | |
| | | | 30 | | | | | |

Figure 29

| J | Message Array | | | DIV | | | P_3 | P_4 |
|---|---|---|---|---|---|---|---|---|
| 1 | PRO | MSG | | SYM | IND | | 28 | 20 |
| | 20 | T | | 1 | A | | | |
| | 5 | | | 2 | B | | | |
| | 19 | | | 3 | C | | | |
| | 27 | | | 4 | D | | | |
| | | | | 5 | E | | | |
| | | | | 6 | F | | | |
| | | | | 7 | G | | | |
| | | | | 8 | H | | | |
| | | | | 9 | I | | | |
| | | | | 10 | J | | | |
| | | | | 11 | K | | | |
| | | | | 12 | L | | | |
| | | | | 13 | M | | | |
| | | | | 14 | N | | | |
| | | | | 15 | O | | | |
| | | | | 16 | P | | | |
| | | | | 17 | Q | | | |
| | | | | 18 | R | | | |
| | | | | 19 | S | | | |
| | | | | 20 | T | | | |
| | | | | 21 | U | | | |
| | | | | 22 | V | | | |
| | | | | 23 | W | | | |
| | | | | 24 | X | | | |
| | | | | 25 | Y | | | |
| | | | | 26 | Z | | | |
| | | | | 27 | T | 28 | | |
| | | | | 28 | | 29 | | |
| | | | | 29 | | 30 | | |
| | | | | 30 | | 20 | | |

Figure 30

| J | Message Array | | | DIV | | | P_3 | P_4 |
|---|---|---|---|---|---|---|---|---|
| 2 | PRO | MSG | | SYM | IND | | 29 | 5 |
| | 20 | T | 1 | A | | | | |
| | 5 | E | 2 | B | | | | |
| | 19 | | 3 | C | | | | |
| | 27 | | 4 | D | | | | |
| | | | 5 | E | | | | |
| | | | 6 | F | | | | |
| | | | 7 | G | | | | |
| | | | 8 | H | | | | |
| | | | 9 | I | | | | |
| | | | 10 | J | | | | |
| | | | 11 | K | | | | |
| | | | 12 | L | | | | |
| | | | 13 | M | | | | |
| | | | 14 | N | | | | |
| | | | 15 | O | | | | |
| | | | 16 | P | | | | |
| | | | 17 | Q | | | | |
| | | | 18 | R | | | | |
| | | | 19 | S | | | | |
| | | | 20 | T | 20 | | | |
| | | | 21 | U | | | | |
| | | | 22 | V | | | | |
| | | | 23 | W | | | | |
| | | | 24 | X | | | | |
| | | | 25 | Y | | | | |
| | | | 26 | Z | | | | |
| | | | 27 | T | 28 | | | |
| | | | 28 | E | 29 | | | |
| | | | 29 | | 30 | | | |
| | | | 30 | . | 20 | | | |

Figure 31

| J | Message Array | | | DIV | | | P_3 | P_4 |
|---|---|---|---|---|---|---|---|---|
| 3 | PRO | MSG | | SYM | IND | | 30 | 19 |
| | 20 | T | | 1 | A | | | |
| | 5 | E | | 2 | B | | | |
| | 19 | S | | 3 | C | | | |
| | 27 | | | 4 | D | | | |
| | | | | 5 | E | 5 | | |
| | | | | 6 | F | | | |
| | | | | 7 | G | | | |
| | | | | 8 | H | | | |
| | | | | 9 | I | | | |
| | | | | 10 | J | | | |
| | | | | 11 | K | | | |
| | | | | 12 | L | | | |
| | | | | 13 | M | | | |
| | | | | 14 | N | | | |
| | | | | 15 | O | | | |
| | | | | 16 | P | | | |
| | | | | 17 | Q | | | |
| | | | | 18 | R | | | |
| | | | | 19 | S | | | |
| | | | | 20 | T | 20 | | |
| | | | | 21 | U | | | |
| | | | | 22 | V | | | |
| | | | | 23 | W | | | |
| | | | | 24 | X | | | |
| | | | | 25 | Y | | | |
| | | | | 26 | Z | | | |
| | | | | 27 | T | 28 | | |
| | | | | 28 | E | 29 | | |
| | | | | 29 | S | 30 | | |
| | | | | 30 | | 20 | | |

Figure 32

| J | Message Array | | | DIV | | | P_3 | P_4 |
|---|---|---|---|---|---|---|---|---|
| 4 | PRO | MSG | | SYM | IND | | 1 | 27 |
| | 20 | T | 1 | A | | | | |
| | 5 | E | 2 | B | | | | |
| | 19 | S | 3 | C | | | | |
| | 27 | T | 4 | D | | | | |
| | | | 5 | E | 5 | | | |
| | | | 6 | F | | | | |
| | | | 7 | G | | | | |
| | | | 8 | H | | | | |
| | | | 9 | I | | | | |
| | | | 10 | J | | | | |
| | | | 11 | K | | | | |
| | | | 12 | L | | | | |
| | | | 13 | M | | | | |
| | | | 14 | N | | | | |
| | | | 15 | O | | | | |
| | | | 16 | P | | | | |
| | | | 17 | Q | | | | |
| | | | 18 | R | | | | |
| | | | 19 | S | 19 | | | |
| | | | 20 | T | 20 | | | |
| | | | 21 | U | | | | |
| | | | 22 | V | | | | |
| | | | 23 | W | | | | |
| | | | 24 | X | | | | |
| | | | 25 | Y | | | | |
| | | | 26 | Z | | | | |
| | | | 27 | T | 28 | | | |
| | | | 28 | E | 29 | | | |
| | | | 29 | S | 30 | | | |
| | | | 30 | T | 20 | | | |

METHOD FOR THE PROTECTION OF MESSAGES TRANSMITTED USING PUBLIC COMMUNICATION LINES

FIELD OF APPLICATION

The invention pertains to the fields of digital data processing and communication and, more particularly, to message encryption. The invention has application in the protection of messages transmitted over public communication lines.

BACKGROUND OF THE INVENTION

Encryption systems are used to encode messages for transmissions over unsecured communications media, e.g., the Internet, phone lines, etc. In a rudimentary system, for example, each letter in the message is replaced by the preceding letter in the alphabet. Thus, the message "IBM" is encrypted as "HAL," while the message "THE LAZY FOX" is encrypted as "SGD KZYX EPW." Anyone receiving such a message can readily decrypt the original message if they are aware of, or guess, the mechanistic technique.

Among the more advance encryption systems are those where an encrypted message can only be decrypted by persons having a secret password, or key. In so-called cryptographic systems, the key represents a determined way of symbol transformation, whereas in mathematical translation systems, the key represents an adopted way of translation. A common disadvantage of either such systems lays in the use of private keys, which can be discovered by guessing or by systematic search.

Comparing different public coding systems, it has been found that public coding systems based on techniques described in paper N.G. de Bruijn, "A Combinatorial Problem," Proc. Netherlands' Acad. van Wtenschappen, vol. 49, pp: 758–764; 1946 are successful. These systems rely on the use of perfect maps, which may be defined as follows:

Given positive integers r, s, u, and v, a perfect map (r, s, u, v) is defined as a periodic binary array r x s in which binary subarray u x v occurs only once as a periodic subarray.

It is obvious that this definition is based on a field GF(2). Introducing two-dimensions, a shifting in two dimensions is enabled, therefore a given, two-dimensional binary array can be transformed in a protected sequence using a regular translation function. Hence, the discovering of a key used to make a protected sequence is hardened. A disadvantage of this method lays in the regularity of message protection, which can be discovered anyway, because it is not dependent on pervious messages. A subarray u x v repeats regularly, which is obvious from the linear recurrence:

$$(E^m + \Sigma a_j E^{m-j}) S_i = 0$$

In view of the foregoing, an object of the invention is to provide improved systems for transmission of message and, more particularly, improved encryption of messages transferred over potentially unsecured media.

SUMMARY OF THE INVENTION

The foregoing and other objects are attained by the invention which provides a method of encrypting and decrypting messages using dynamic vectors that change in accord with the content of the messages.

In one aspect, the invention provides a method for encrypting into a protected sequence a message defined by a sequence of one or more symbols, comprising the steps of generating an input vector comprising a plurality of entries, each entry including a symbol and a corresponding index; generating a dynamic symbol vector comprising a plurality of entries, zero, one or more of which entries represent a protection index for the respective symbol; generating pointers P1 and P2 corresponding to a first and last free indices in said dynamic symbol vector; and generating the protected sequence by executing several steps for each successive symbol in said message.

Those several steps include appending to a prior protected sequence, if any, an index from the input vector corresponding to said symbol; storing the dynamic symbol vector at a locating corresponding to a value of P2 the index from said input vector corresponding to said symbol; storing as P2 a value of the index from the input vector corresponding to the symbol, storing a value of P1 as the index of said input vector corresponding to said symbol; and storing as P1 a value of a next first free index in said dynamic symbol vector.

In another aspect, the invention provides a method of decrypting into a message a protected sequence defined by one or more protection indices. That method includes the steps of generating a dynamic index vector comprising a plurality of entries, each entry including a symbol and a corresponding index; generating pointers P3 and P4 corresponding to first and last free indices in the dynamic index vector; and generating the message by executing several steps for each successive protection index in said message.

Those several steps include appending to a prior message, if any, a symbol from the dynamic index vector corresponding to said protection index; storing that symbol in said dynamic index vector at a location corresponding to a value of P3; storing the protection index in the dynamic index vector at a location corresponding to a value of P4; storing the protection index as P4, and storing as P3 a value of next first free index in said dynamic index vector.

In still other aspects, the invention provides a method for encrypting a message in the manner described above, transmitting that encrypted message to a recipient, receiving that message by the recipient and decrypting it in accord with the manner described above.

These and other aspects of the invention are evident in the drawings and in the description that follows.

BRIEF DESCRIPTION OF THE DRAWINGS

FIG. 1 represents an initial state of the data stores of a digital data processor that generates a protected sequence from the message "ABRACADABRA."

FIGS. 2–11 represents successive states of the data stores of a digital data processor as it transforms each successive symbol of the message "ABRACADABRA."

FIG. 12 represents the state of the data stores of a digital data processor that transforms the aforementioned protected sequence back into the message "ABRACADABRA."

FIG. 13–22 represents successive states of the data stores of a digital data processor as it transforms each successive index of the protected sequence into the message "ABRACADABRA."

FIGS. 22–32 represent successive states of data stores of a digital data processor as it transforms the message "TEST" into a protected sequence, and as it transforms that sequence back into the original message.

DETAILED DESCRIPTION OF THE ILLUSTRATED EMBODIMENT

MESSAGE TRANSFORMATION INTO THE PROTECTED SEQUENCE

Figure 5:
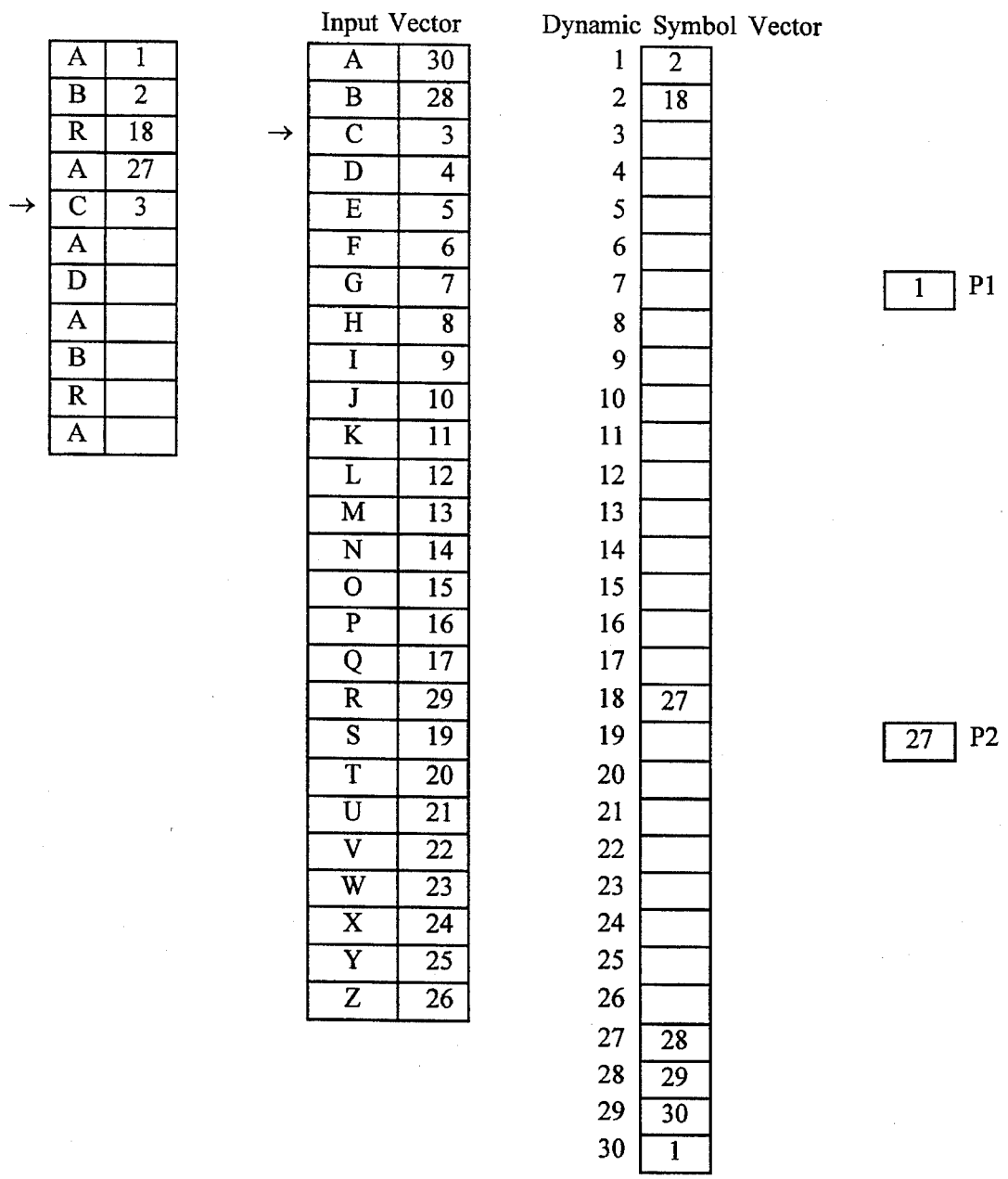

The transformation method uses two vectors, input vector (IV) and dynamic symbol vector, (DSV), and two pointers (P1, P2, FIG. 1).

An input vector's element is represented by a structure consisting of two fields: symbol field and index field. Symbol field contains a symbol that can be used within a message. Index field contains an index in dynamic symbol vector that represents the protection index for the given symbol at time.

Dynamic symbol vector changes during the transformation phase, so that in each step it contains some indexes reserved for symbols and a list of free indexes.

Begin-of-list and end-of-list indexes are recorded in the corresponding pointers (P1, P2).

The input vector can be generated using the user's name, to whom the message is dedicated, as a seed for the pseudo-random number generator, which defines the set of symbols recorded within the symbol fields. Index fields contain successive first indexes within dynamic symbol vector.

At the beginning the dynamic symbol vector contains the first part reserved for symbols, while the second part represents a list of free indexes.

Let the first message be "A". The protection index ("1"), that corresponds to this symbol at time, can be found within the corresponding index field of input vector (FIG. 2). After the protection index is inserted into the protection sequence, it is necessary to alter the values of both vectors. The value of index field for symbol "A" in input vector should take the value of pointer P1 ("i"). For the dynamic symbol vector three changes should be made:

at the end of free index list add used protection index ("1");

change pointer P1 to point to first free index ("i+1"); and change pointer P2 to point to used protection index ("1").

For each successive symbol, the described procedure is repeated. See FIGS. 2–11. To avoid regularity in the transformation method, after the message protection is finished, it is necessary to save the states of two vectors (IV and DSV), and both pointers (P1 and P2).

A method for transforming a message into a protected sequence as described above can be executed on a general purpose digital data processor, as well as on special purpose hardware. In view of the teachings herein, those skilled in the art will appreciate that the method can be readily implemented using conventional programming techniques on any such equipment.

A message encrypted as described above can be transmitted between a sender and a recipient in any one of many conventional manners known in the art, e.g., phone lines, computer bulletin boards, etc., whether or not secure.

TRANSFORMATION OF PROTECTED SEQUENCE INTO THE MESSAGE

The illustrated system uses a dynamic index vector (DIV), and two pointers (P3 and P4, FIG. 12), to transform the protected sequece back into a message.

A dynamic index vector element represents a structure which consists of two fields: symbol field, and index field. At the beginning, this vector contains the first part reserved for symbols, while the second part represents a list of free indexes. In the part reserved for symbols, only the symbol field is used, while in the free index list only the index field is used.

The begin-of-list and end-of-list indexes of DIV are recorded in two pointers (P3 and P4).

The dynamic index vector can be generated using the user's name, to whom the message is dedicated, as a seed for the pseudo-random number generator which defines the set of symbols, (same as in input vector) recorded within the symbol fields. At the beginning, the first part of the dynamic symbol vector is reserved for symbols, while the second part represents a list of free indexes.

Let the first protection index be "1" Symbol "A", that corresponds to this protection index at this time, can be found within the corresponding symbol field of dynamic index vector (FIG. 13). After the symbol is inserted into the source message, it is necessary to perform the following changes:

insert the found symbol ("A") into the symbol field that belongs to first free index (P3=i);

at the end of free index list add the used protection index ("1");

change pointer P3 to point to first free index ("i+1"); and change pointer P4 to point to used protection index ("1").

For each successive protection index, the described procedure is repeated. See FIGS. 13–22. To avoid regularity in the transformation method, after the message protection is finished, it is necessary to save the states of DIV, and both pointers (P3 and P4).

A further understanding of the invention may be attained by reference to FIGS. 23–32, which depict successive states of the data stores of a digital data processor as it transforms the message "TEST" into a protected sequence, and as it transforms that sequence back into the original message. Computer spreadsheet macros used to encrypt/decrypt the message "TEST" using the teachings herein are supplied in the appendix. While the invention is likely to be implemented in more conventional programming languages for practical application, the macros further illustrate the workings of encrypting and decryption mechanism according to the invention.

Using the described method, it is possible to protect any kind of messages, no matter what is the nature of used symbols.

A further appreciation of the invention may be attained through the following discussion of its theoretical basis.

THE CLASSICAL EXPLORATION MEANS

The principal of synthesis of model

The principal of synthesis of model is based on the capabilities of man to separate, by his senses, the phenomena from their surroundings in natural space, with their static and dynamic relations, and thus separated and systematized, to remember and to create a conscience of his environment, and from his conscience to be able to recall all that has been memorized in the form of analogous real state of environment during the process of separation and learning.

Knowledge transfer approaches

Knowledge transfer approaches are based on a mathematical definition of space given independently by Mr. Frechet (1904) and E.H. Moore (1905). Some other authors such as R. Riesc, F. Hausdorff, Kuratowsky, etc., also gave their contributions to this field. The most general definition gave Dj. Kurepa:

Space is every defined organized pair $$\Pi = (E, \pi) \quad (1)$$

consisting of an arbitrary set E and arbitrary set $\pi$ which to every $X \subset E$ joins the one single set $\pi(X) \subseteq E$ which is called spatialhess or adherence of set X.

All existing solutions for the message protection are based on the classical exploration means. The theory used to describe the phenomena cannot give the satisfactory solution for the message protection problem. All these message protection methods can be cracked.

NEW EXPLORATION MEANS

The exploration means used to implement the invention comprise:

The principal of synthesis of model

The principal of impact is used for the model of synthesis. The principal of impact is based on the characteristics of natural phenomena which appears as:

- origin of an impact, which represents phenomena capable of performing actions on similar phenomena in their surroundings;
- recipient of an impact, which represents phenomena able to convert an outside impact into an increase of their internal work (energy).

Knowledge transfer approaches

Connective space is made of structured trio:

$$\Pi_i = (E, @, S) \quad (2)$$

Where:

$\Pi_i$—designates connection space;

E—arbitrary set of elements;

@—set of impacts dependent on their origins;

S—set of structurings dependent on impacts;

along with that element of set E are structured among themselves by impact @ in structure S (in stable spatial mutual relationships).

This connective space represents the basis of connective algebra. The basic characteristics of connective algebra are:

1. Each phenomenon has one and only one description (each change in the environment in which the phenomenon appears, alters the description of the phenomenon. Besides, the changes of impact intensity, changes of mutual spatial relationships of elements and changes of outside impacts on the phenomenon, also alters the description of the phenomenon).

2. Each problem solved using connective algebra has one and only one solution.

Within the public coding system of the invention, the environment is represented by the user's disk, therefore each time a symbol or set of symbols (E) is protected, it is protected using different protection sequences. The solution is unique, hence the protection sequence can never be repeated.

Connective algebra represents an approach for knowledge transfer. This algebra is suitable for describing natural phenomena. It is described in a monograph, "New Means for the Exploration of Natural Phenomena", by V. P. Masnikosa. This monograph is accepted for publication.

The knowledge abut the theory of connective algebra itself is not sufficient to extract the message from the protection sequence, because with each new symbol, we want to protect, we change the environment, hence the description conditions too. Nobody is able to predict new conditions, because there is no regularity that can be used for such a prediction. In this public coding system, only the protection method is regular. Therefore only the method can be protected by a patent, because only the method can be described.

By quitting the public coding system, the environment is saved on the user's disk. This saved environment (the conditions for description of phenomena—words) is changed in the successive use of public coding system, when the first letter is protected.

The principal on which the public coding system of the invention is based does not belong to classical formal language (classical mathematics). It belongs to the formal language which is described by connective algebra. Therefore, it is very difficult to understand this new viewpoint and the new exploration means: the principal of synthesis of model and knowledge transfer means.

Described above is a system meeting two objects set forth herein. It will be appreciated that the illustrated embodiment is presented by way of example only, and that further embodiments incorporating changes therein fall within the scope of the invention.

In view of the foregoing, what I claim is:

1. A method for encrypting into a protected sequence a message defined by a sequence of one or more symbols, said method comprising:

generating an input vector comprising a plurality of entries, each entry including a symbol and a corresponding index, generating a dynamic symbol vector comprising a plurality of entries, zero, one or more of which entries represent a protection index for the respective symbol, generating a pointer P1 corresponding to a first free index in said dynamic symbol vector, generating a pointer P2 corresponding to a last free index in said dynamic symbol vector, generating said protected sequence by executing the following steps for each successive symbol in said message appending to a prior protected sequence, if any, an index from said input vector corresponding to said symbol, storing in said dynamic symbol vector at a location corresponding to a value of P2 the index from said input vector corresponding to said symbol, storing as P2 a value of the index from said input vector corresponding to aid symbol, storing a value of P1 as the index of said input vector corresponding to said symbol, storing a P1 a value of a next first free index in said dynamic symbol vector.

2. A method according to claim 1 comprising generating the symbols in the entries of said input vector using a substantially random number generator and generating the corresponding indexes for those symbols as successive first indexes to dynamic symbol vector.

3. A method according to claim 2 comprising generating the symbols in the entries of said input vector using a substantially random number based on a name of a recipient of the message.

4. A method according to claim 1 comprising saving the input vector, the dynamic symbol vector and the pointers P1 and P2 subsequent to encrypting said message for use encrypting a next message to a same recipient.

5. A method of decrypting into a message a protected sequence defined by one or more protection indices, said method comprising generating a dynamic index vector comprising a plurality of entries, each entry including a symbol and a corresponding index, generating a pointer P3 corresponding to a first free index in said dynamic index vector, generating a pointer P4 corresponding to a last free index in said dynamic index vector, generating said message by executing the following steps for each successive protection index in said message:

appending to a prior message, if any, a symbol from said dynamic index vector corresponding to said protection index, storing that symbol in said dynamic index vector at a location corresponding to a value of P3, storing said protection index in said dynamic index vector at a location corresponding to a value of P4, storing said protection index as P4, and storing as P3 a value of a next first free index in said dynamic index vector.

6. A method according to claim 5 comprising generating the symbols in the entries of said dynamic index vector using a substantially random number generator.

7. A method according to claim 6 comprising generating the symbols in the entries of said dynamic index vector using a substantially random number based on a name of a recipient of said protected sequence.

8. A method according to claim 5 comprising saving the dynamic index vector and the pointers P3 and P4 subsequent to encrypting said message for use decrypting a next protected sequence from a same sender.

9. A method for encrypting into a protected sequence a message defied by a sequence of one or more symbols, said method comprising:

generating an input vector comprising a plurality of entries, each entry including a symbol and a corresponding index, generating a dynamic symbol vector comprising a plurality of entries, zero, one or more of which entries represent a protection index for the respective symbol, generating a pointer P1 corresponding to a first free index in said dynamic symbol vector, generating a pointer P2 corresponding to a last free index in said dynamic symbol vector, generating said protected sequence by executing the following steps for each successive symbol in said message appending to a prior protected sequence, if any, an index from said input vector corresponding to said symbol, storing in said dynamic symbol vector at a location corresponding to a value of P2 the index from said input vector corresponding to said symbol, storing as P2 a value of the index from said input vector corresponding to said symbol, storing a value of P1 as the index of said input vector corresponding to said symbol, storing as P1 a value of a next first free index in said dynamic symbol vector, transmitting said protected sequence to a recipient, receiving said protected sequence by said recipient, generating a dynamic index vector comprising a plurality of entries, each entry including a symbol and a corresponding index, generating a pointer P3 corresponding to a first free index in said dynamic index vector, generating a pointer P4 corresponding to a last free index in said dynamic index vector, generating said message by executing the following steps for each successive protection index in said message:

appending to a prior message, if any, a symbol from said dynamic index vector corresponding to said protection index, storing that symbol in said dynamic index vector at a location corresponding to a value of P3, storing said protection index in said dynamic index vector at a location corresponding to a value of P4, storing said protection index as P4, and storing as P3 a value of a next first free index in said dynamic index vector.

* * * * *